United States Patent
Fan et al.

(10) Patent No.: US 12,026,930 B2
(45) Date of Patent: Jul. 2, 2024

(54) COMPLEMENTARY LEARNING FOR MULTI-MODAL SALIENCY DETECTION

(71) Applicant: Inception Institute of Artificial Intelligence Ltd, Abu Dhabi (AE)

(72) Inventors: Deng-Ping Fan, Abu Dhabi (AE); Jing Zhang, ACT (AU); Yuchao Dai, Xi'an (CN); Xin Yu, Sydney (AU); Yiran Zhong, ACT (AU); Nick Barnes, ACT (AU); Ling Shao, Abu Dhabi (AE)

(73) Assignee: Inception Institute of Artificial Intelligence Ltd, Abu Dhabi (AE)

( * ) Notice: Subject to any disclaimer, the term of this patent is extended or adjusted under 35 U.S.C. 154(b) by 410 days.

(21) Appl. No.: 17/475,099

(22) Filed: Sep. 14, 2021

(65) Prior Publication Data

US 2022/0253639 A1 Aug. 11, 2022

Related U.S. Application Data

(60) Provisional application No. 63/144,175, filed on Feb. 1, 2021.

(51) Int. Cl.
*G06V 10/46* (2022.01)
*G06N 3/045* (2023.01)
*G06N 3/08* (2023.01)
*G06V 10/82* (2022.01)

(52) U.S. Cl.
CPC ........... *G06V 10/462* (2022.01); *G06N 3/045* (2023.01); *G06N 3/08* (2013.01); *G06V 10/82* (2022.01)

(58) Field of Classification Search
CPC .... G06V 10/82; G06V 10/462; G06V 10/806; G06V 10/25; G06V 10/255; G06V 10/454; G06N 3/02–0985; G06T 2207/20081; G06T 2207/20084
See application file for complete search history.

(56) References Cited

PUBLICATIONS

Li, Gongyang, Zhi Liu, and Haibin Ling. "ICNet: Information conversion network for RGB-D based salient object detection." IEEE Transactions on Image Processing 29 (2020): 4873-4884. (Year: 2020).*
Zhou, Tao, et al. "RGB-D Salient Object Detection: A Survey." arXiv preprint arXiv:2008.00230v3 (2020). (Year: 2020).*
Jun Fu et al., "Dual Attention Network for Scene Segmentation", 2019, 9 pages.
Jing Zhang et al., "UC-Net: Uncertainty Inspired RGB-D Saliency Detection via Conditional Variational Autoencoders", 2020, 10 pages.
Maoke Yang et al., "DenseASPP for Semantic Segmentation in Street Scenes", 2018, 9 pages.
Kaiming He et al., "Deep Residual Learning for Image Recognition", 2016, pages.

* cited by examiner

*Primary Examiner* — Geoffrey E Summers
(74) *Attorney, Agent, or Firm* — Stetina Brunda Garred & Brucker (57) ABSTRACT

A saliency detection explicitly models complementary information between appearance, or color, and depth information in images. A mutual-information minimization is used as a regularizer to reduce the redundancy between appearance features from RGB and geometric features from depth in the latent space. Then the latent features of each of the appearance and geometric modalities are fused to achieve multi-modal feature fusion for saliency detection.

21 Claims, 7 Drawing Sheets

COMPLEMENTARY LEARNING FOR MULTI-MODAL SALIENCY DETECTION

CROSS-REFERENCE TO RELATED APPLICATIONS

This application claims the benefit of U.S. Provisional Application No. 63/144,175 filed Feb. 1, 2021, the contents of which are expressly incorporated herein by reference.

STATEMENT RE: FEDERALLY SPONSORED RESEARCH/DEVELOPMENT

Not Applicable

BACKGROUND

Technical Field

The current disclosure relates to saliency detection on images, and in particular to saliency detection on images with both depth information and appearance or color information.

Background

Saliency detection models can be trained to discover the region(s) of an image that attract human attention. According to whether depth data is used, static image saliency detection models can be divided into RGB image saliency detection models, which predict saliency regions from an input RGB image, and RGB-D saliency detection models, which take both the RGB image and depth data as input. With the availability of datasets with extra depth data, RGB-D saliency detection has attracted great attention recently. Although huge performance improvements have been witnessed, none of the state-of-the-art (SOTA) methods model the procedure of complementary learning explicitly.

The RGB image provides appearance/color information, while the depth data introduces geometric information. Effective fusion of these two types of data can lead to a model that benefits from both modalities. Towards this goal, existing RGB-D saliency detection models focus on fusing the information of these two modalities. Three main fusion strategies have been widely studied for RGB-D saliency detection: early fusion, late fusion and cross-level fusion.

Although the three fusion strategies can learn from both RGB and depth data, there is no constraint in the network design to force a network to learn complementary information from the two modalities. An additional, alternative and/or improved method and system for saliency detection on images with depth information is desirable.

BRIEF SUMMARY

In accordance with the present disclosure there is provided a method of saliency detection on images including both appearance and depth information, the method comprising: processing appearance information of an image with a first saliency encoder to extract appearance features from the image; processing depth information of the image with a second saliency encoder to extract depth features from the image; processing the extracted appearance features with a first latent feature module to generate a latent appearance feature; processing the extracted depth features with a second latent feature module to generate a latent depth feature; in a first appearance complimentary learning branch, fusing at least a portion of the extracted appearance features with the latent depth feature to generate an appearance saliency prediction; in a second appearance complimentary learning branch, fusing at least a portion of the extracted depth features with the latent appearance feature to generate a depth saliency prediction; and processing the extracted appearance features, extracted depth features, appearance saliency prediction and depth saliency prediction to obtain a combined saliency prediction providing an indication of salient locations within the image.

In a further embodiment of the method, the first latent feature module and the second latent feature module are trained based on mutual information between latent appearance features of training images and latent depth features of the training images.

In a further embodiment of the method, the mutual information measures a difference between entropy of the latent appearance features of the training images and the latent depth features of the training images.

In a further embodiment of the method, an objective function used in training the first and second latent feature modules is given by:

$$\mathcal{L} = \mathcal{L}_{ce}(P,Y) + \lambda_1 \mathcal{L}_{ce}(P_f,Y) + \lambda_2 \mathcal{L}_{ce}(P_a,Y) + \lambda_3 \mathcal{L}_{ce}(P_g,Y) + \lambda \mathcal{L}_{mi}(z_a,z_g),$$

In a further embodiment of the method, the first latent feature module and the second latent feature module each comprise five convolution layers and two fully connected layers.

In a further embodiment of the method, each of the five convolution layers of the first latent feature module and the second latent feature module have a kernel size of 4×4 and a stride size of 2.

In a further embodiment of the method, the first and second saliency encoders have a common network architecture.

In a further embodiment of the method, the common network architecture is based on a ResNet 50 network.

In a further embodiment of the method, the common network architecture comprises four convolutional groups.

In a further embodiment of the method, the common network architecture further comprises an additional convolutional layer of kernel size 3×3 after each convolutional group.

In accordance with the present disclosure there is further provided a non-transitory computer readable medium having stored thereon instructions, which when executed by a processor of a computing system, configure the computing system to perform a method of saliency detection on images including both appearance and depth information, the method comprising: processing appearance information of an image with a first saliency encoder to extract appearance features from the image; processing depth information of the image with a second saliency encoder to extract depth features from the image; processing the extracted appearance features with a first latent feature module to generate a latent appearance feature; processing the extracted depth features with a second latent feature module to generate a latent depth feature; in a first appearance complimentary learning branch, fusing at least a portion of the extracted appearance features with the latent depth feature to generate an appearance saliency prediction; in a second appearance complimentary learning branch, fusing at least a portion of the extracted depth features with the latent appearance feature to generate a depth saliency prediction; and processing the extracted appearance features, extracted depth features, appearance saliency prediction and depth saliency prediction to obtain a combined saliency prediction providing an indication of salient locations within the image.

In a further embodiment of the computer readable medium, the first latent feature module and the second latent feature module are trained based on mutual information between latent appearance features of training images and latent depth features of the training images.

In a further embodiment of the computer readable medium, the mutual information measures a difference between entropy of the latent appearance features of the training images and the latent depth features of the training images.

In a further embodiment of the computer readable medium, an objective function used text use in training the first and second latent feature modules is given by:

$$\mathcal{L} = \mathcal{L}_{ce}(P,Y) + \lambda_1 \mathcal{L}_{ce}(P_f,Y) + \lambda_2 \mathcal{L}_{ce}(P_a,Y) + \lambda_3 \mathcal{L}_{ce}(P_g,Y) + \lambda \mathcal{L}_{mi}(z_a,z_g),$$

In a further embodiment of the computer readable medium, the first latent feature module and the second latent feature module each comprise five convolution layers and two fully connected layers.

In a further embodiment of the computer readable medium, each of the five convolution layers of the first latent feature module and the second latent feature module have a kernel size of 4×4 and a stride size of 2.

In a further embodiment of the computer readable medium, the first and second saliency encoders have a common network architecture.

In a further embodiment of the computer readable medium, the common network architecture is based on a ResNet 50 network.

In a further embodiment of the computer readable medium, the common network architecture comprises four convolutional groups.

In a further embodiment of the computer readable medium, the common network architecture further comprises an additional convolutional layer of kernel size 3×3 after each convolutional group.

In accordance with the present disclosure there is further provided a system saliency detection on images including both appearance and depth information, the system comprising: a processor for executing instructions; and a memory for storing instructions, which when executed by the processor configure the system to implement a method of saliency detection on images including both appearance and depth information, the method comprising: processing appearance information of an image with a first saliency encoder to extract appearance features from the image; processing depth information of the image with a second saliency encoder to extract depth features from the image; processing the extracted appearance features with a first latent feature module to generate a latent appearance feature; processing the extracted depth features with a second latent feature module to generate a latent depth feature; in a first appearance complimentary learning branch, fusing at least a portion of the extracted appearance features with the latent depth feature to generate an appearance saliency prediction; in a second appearance complimentary learning branch, fusing at least a portion of the extracted depth features with the latent appearance feature to generate a depth saliency prediction; and processing the extracted appearance features, extracted depth features, appearance saliency prediction and depth saliency prediction to obtain a combined saliency prediction providing an indication of salient locations within the image.

BRIEF DESCRIPTION OF THE DRAWINGS

Further features and advantages of the present disclosure will become apparent from the following detailed description, taken in combination with the appended drawings, in which.

DETAILED DESCRIPTION

A complementary learning based RGB-D saliency detection framework (CLNet) that explicitly models complementary information between RGB images and depth data is described further below. By minimizing the mutual information between these two modalities during training, the current model focuses on the complementary information rather than the mutual information. In this fashion, CLNet is able to exploit the multi-modal information more effectively.

Images that include both appearance and depth information, it is possible to use both the appearance and depth information in the saliency detection. The appearance information may comprise, for example color information such as RGB data or other types of color information. The depth information provides information on the depth or distance from the camera of each location in the image and may be represented in various ways, including for example as a grey scale image. The depth information may also be considered as describing the geometry of the image. As described further herein, each of the modalities, namely the appearance and depth modalities may be combined together for saliency detection. As a multi-modal learning task, a trained model should maximize the joint entropy of different modalities within the network capacity. Maximizing the joint entropy is also equal to the minimization of mutual information, which prevents a network from focusing on redundant information. To explicitly model the complementary information between the appearance information, referred to further herein as RGB image, and depth data, a latent-variable model based RGB-D saliency detection network with a mutual information minimization regularizer is provided. A "Complementary Learning" module is used to explicitly model the redundancy between appearance features and geometric or depth features as well as to fuse appearance features with depth features in latent space to achieve multi-modal fusion.

For RGB-D saliency detection, a focus is to explore the complementary information between the RGB image and the depth data. The former provides appearance information of the scenario, while the latter introduces geometric information. Depending on how information from these two modalities is fused, existing RGB-D saliency detection models can be divided into three main categories: early-fusion models, late-fusion models and cross-level fusion models. The first solution directly concatenates the RGB image with its depth information, forming a four-channel input, while the late fusion models treat each modality (RGB and depth) separately, and then fusion is achieved in the output layer. The above two solutions perform modality-fusion in the input or output, while the cross-level fusion models implement multi-modal fusion in the feature level. Specifically, features of an RGB image and depth are gradually fused to effectively learn complementary information. Although those competing methods fuse the RGB image and depth data, none of them explicitly illustrate how the complementary information is learnt. The current saliency detection model provides a cross-level fusion model. The "Complementary Learning" module reduces redundancy of appearance features and geometric features, and at the same time, it is possible to effectively fuse features of the two modalities in the latent space.

Figure 1:
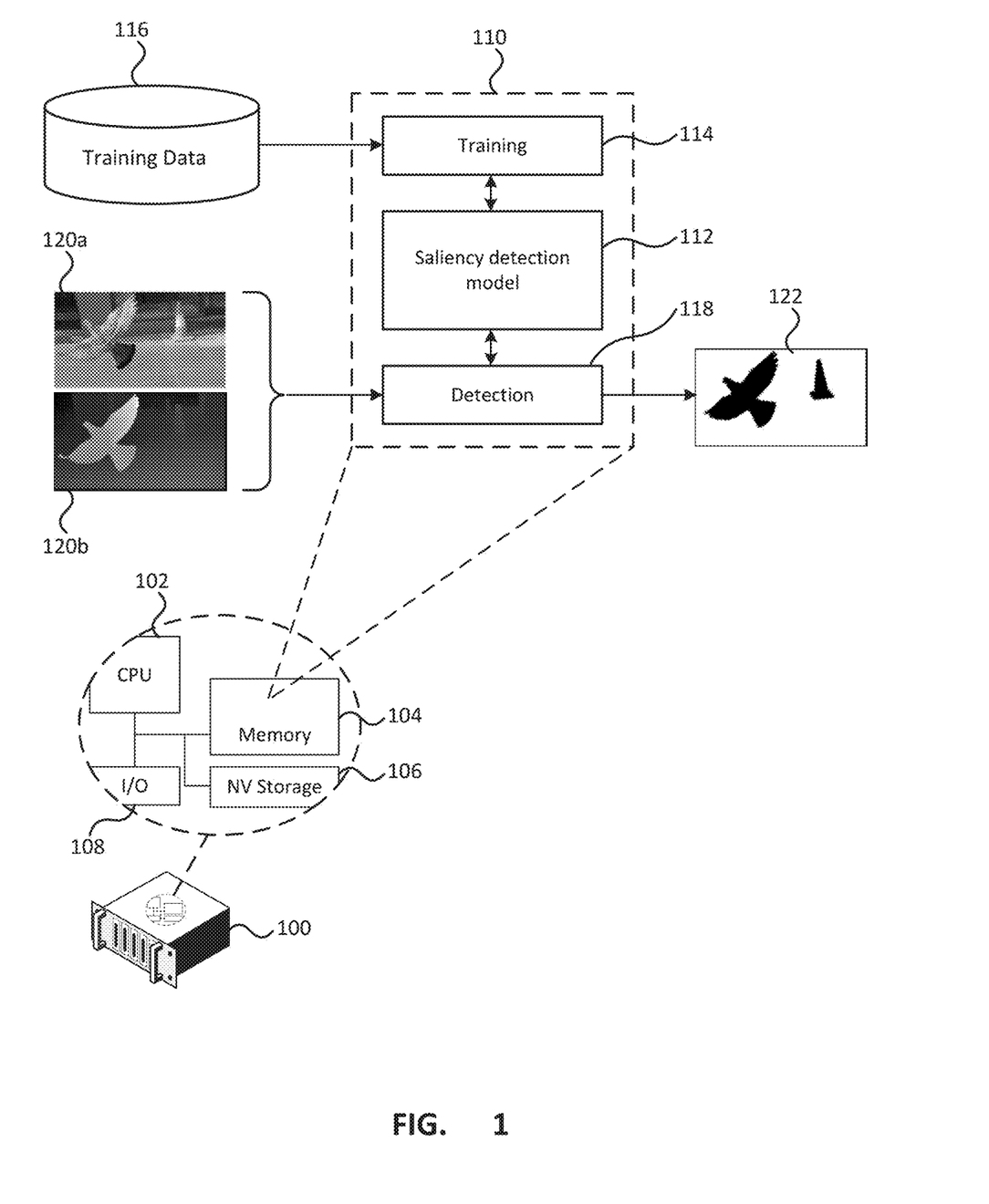
FIG. 1 depicts a multi-modal saliency detection system.

FIG. 1 depicts a multi-modal saliency detection system. FIG. 1 depicts a computer system 100 that implements a multi-modal saliency detection system. The computer system 100 comprises a processor 102 for executing instructions and a memory 104 for storing instructions and data. The computer system 100 may further include non-volatile storage 106 for storage of instructions and data. Further, the computer system 100 may further comprise an input/output (I/O) interface 108 for connecting other input and/or output components to the computer system 100 such as keyboards, monitors, network adapters, graphics processing units (GPU), etc. The instructions stored in memory 104 may be executed by the processor 102 in order to provide multi-modal saliency detection functionality 110. Although described as being provided by executing instructions on the processor 102, the functionality 110 may be provided by executing the instructions, or at least a portion of the instructions, on a GPU.

The multi-modal saliency detection functionality 110 includes a saliency detection model 112 that can be trained and used to predict the salient regions of an image. The saliency detection functionality 110 includes training functionality 114 that is used to train the saliency detection model based on a collection of training data 116. As described further below, the saliency detection model 112 is a latent variable based RGB-D saliency detection network that explicitly models the complementary information between the RGB image and depth data to reduce the redundancy between the appearance features and geometric or depth features. The training data 116 may comprise RGB images with depth data that have been labelled to provide an indication of the regions that attract human attention.

Once sufficiently trained, the saliency detection model 112 may be used to process images. Detection functionality 118 may be used to receive or access an image or images comprising an RGB image 120a and corresponding depth information 120b. The detection functionality 118 processes the image and depth information using the saliency detection model 112 and outputs a prediction of the salient regions of the input images. The output may be provided in various ways including for example as a binary may 122 depicting the image regions that are predicted to be salient regions that attract human attention.

Figure 2:
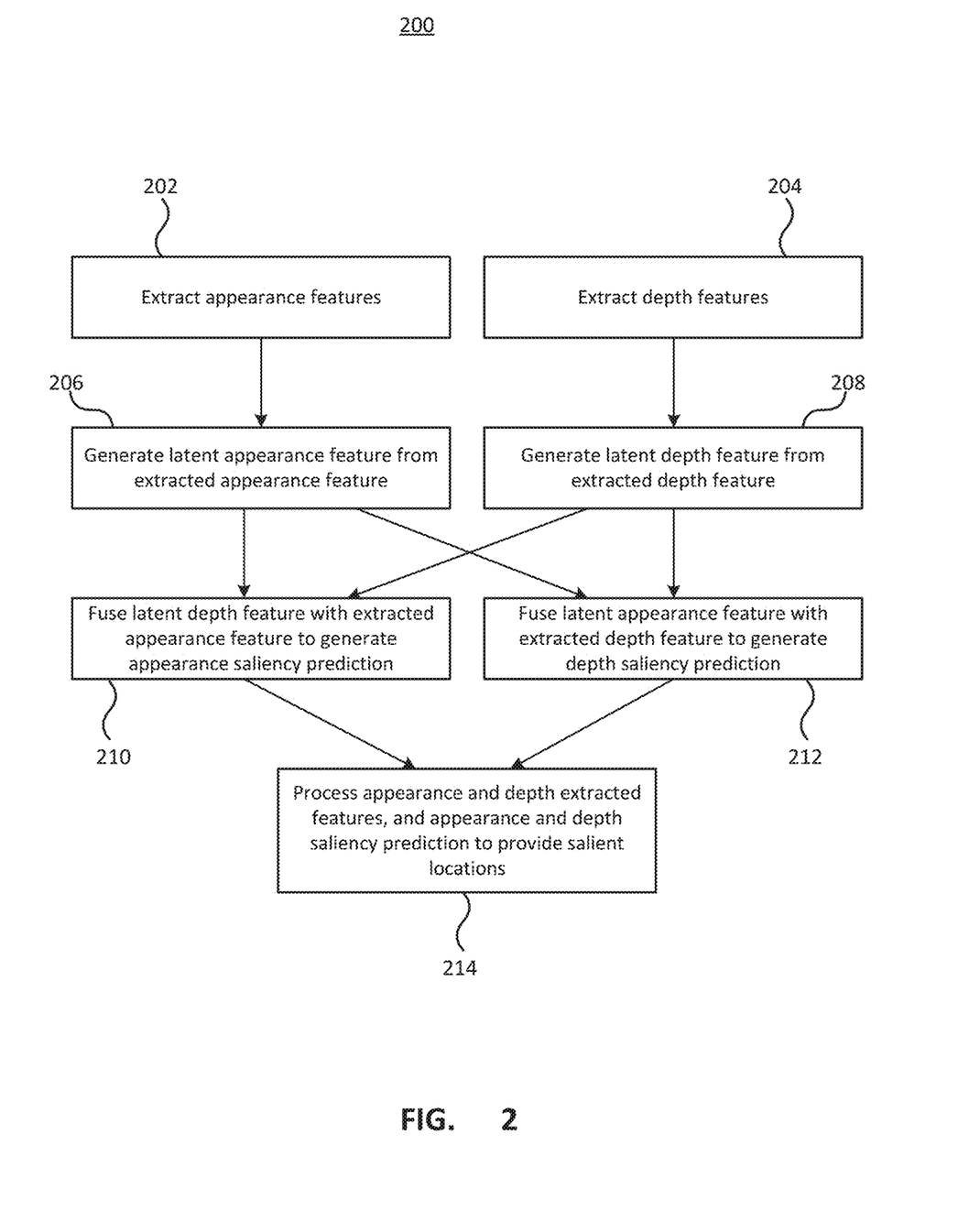
FIG. 2 depicts a method for multi-modal saliency detection system.

FIG. 2 depicts a method for multi-modal saliency detection system. The method 200 receives an image with depth information and extracts appearance features (202) and depth features (204). The feature extraction of both the appearance features and depth features may be done using respective saliency encoders. The saliency encoders output appearance features and depth features, which are each then processed to generate latent appearance feature (206) and latent depth features (208) from the extracted appearance features and extracted depth features respectively. The latent features are then fused with the complementary extracted features to generate respective saliency predictions. In particular, the latent depth feature is fused with the extracted appearance feature to generate an appearance saliency prediction (210) and the latent appearance feature is fused with the extracted depth feature to generate a depth saliency prediction (212). Once the appearance and depth saliency predictions are generated, the predictions, along with the appearance and depth extracted features are processed to provide combined prediction for the salient regions of the image (214) which may then be output.

Figure 3:
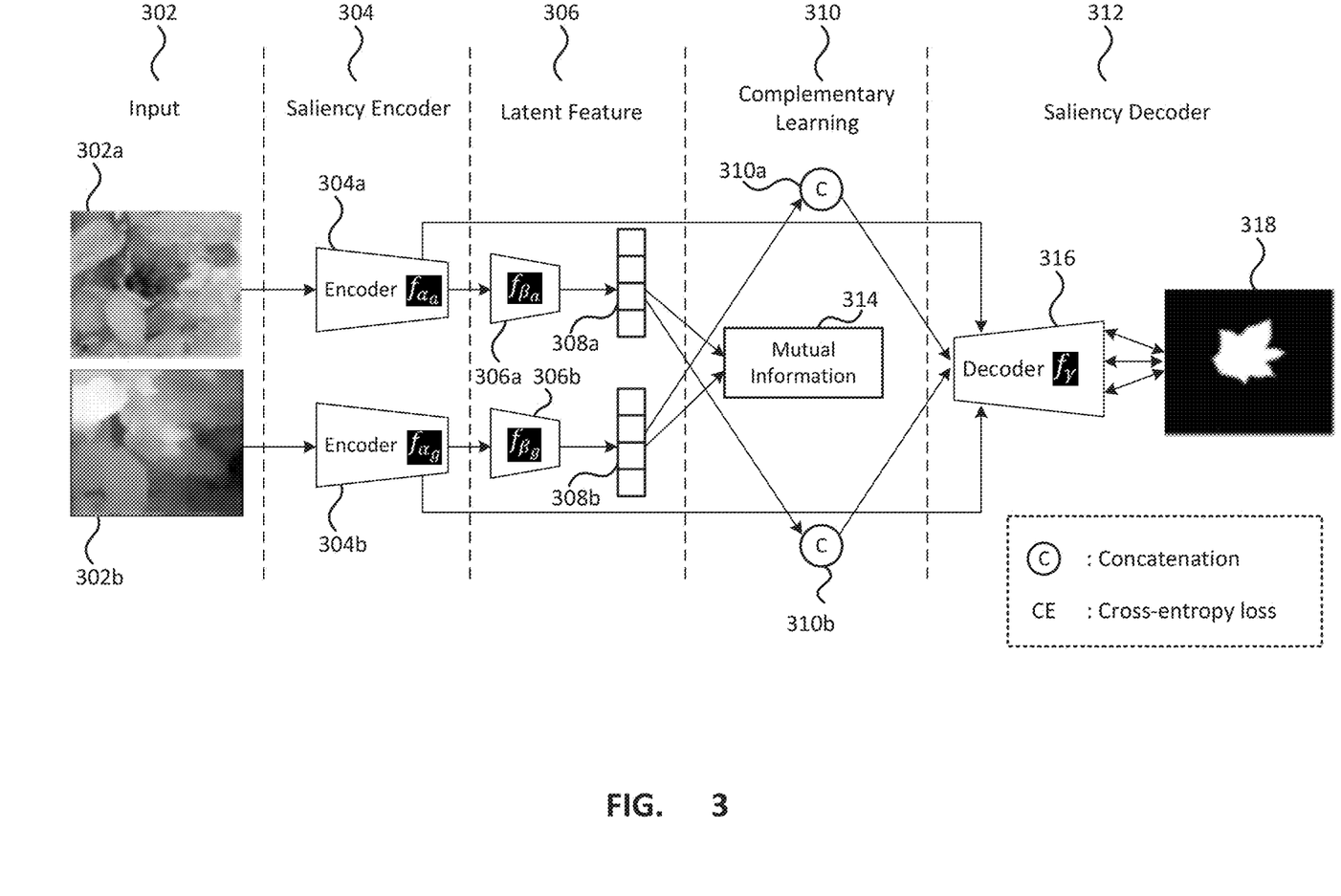
FIG. 3 depicts a multi-modal saliency detection model.

FIG. 3 depicts a multi-modal saliency detection model. The model processes an input 302 using a saliency encoder layer 304 to extract features that are processed by a latent feature layer 306 that makes use of complementary learning 310 to reduce the redundancy between the appearance and depth features. The features and saliency predictions are processed by a saliency decoder layer 312 in order to generate the saliency detection output.

The input 302 comprises an RGB image 302a and associated depth data 302b. The RGB image 302a is processed by an appearance encoder 304a and the depth data 302b is processed by a depth or geometry encoder 304b. The encoders extract features from the respective inputs, which are then processed by respective latent feature models 306a, 306b which generate latent appearance features 308a and latent geometry features 308b. The latent features 308a, 308b are processed by complementary learning branches 310a, 310b in order to generate respective saliency predictions. A mutual information regularizer 314 processes the latent features in order to reduce the redundancy between the two modalities. The saliency predicts from the complementary learning is processed by the saliency decoder 316 which outputs a final saliency prediction of the input image 316.

The training dataset may be denoted as $T=\{X_i, Y_i\}_{i=1}^N$, where i indexes the images and i is the size of the training set, $X_i$ and $Y_i$ are the input RGB-D image pair and its corresponding ground-truth (GT) saliency map. The training image pairs of the RGB image I and the depth D are fed to the saliency encoder, as illustrated in FIG. 3, to extract appearance features $f_{\alpha_a}(I)$ and geometric features $f_{\alpha_g}(D)$ respectively, where $\alpha_a$ and $\alpha_g$ are the parameters of the RGB saliency encoder and depth saliency encoder respectively.

The saliency encoder may be based upon residual network such as a ResNet50-based network, which includes four convolutional groups $\{s^1, s^2, s^3, s^4\}$. An additional convolutional layer of kernel size 3×3 is added after each $s^c \in \{s^c\}_{c=1}^4$ to reduce the channel dimension of $s^c$ to C=32, and obtain feature maps $\{e^1, e^2, e^3, e^4\}$. The final output of the saliency encoder module includes $e_a=\{e_a^1, e_a^2, e_a^3, e_a^4\}$ for the RGB image branch, and $e_g=\{e_g^1, e_g^2, e_g^3, e_g^4\}$ for the depth branch. Note that, the RGB saliency encoder and depth saliency encoder share the same network structure but not weights.

It is noted that latent variable models are those with an extra latent variable embedded in the network to achieve stochastic predictions, which are widely used in image reconstruction and image synthesis, uncertainty estimation, etc. In saliency detection, a latent variable model may be used to model the labeling variants for saliency distribution estimation. Superpixel-wise variational autoencoders (VAE) may reconstruct the background, and define the residual of the reconstructed background and the original image as salient foreground. A generative adversarial net (GAN) based framework may be trained to achieve higher-order ground truth and a prediction similarity measure. A discriminator may be designed to achieve multi-modal fusion. A latent variable model is adopted in the current model to formulate the complementary information between the RGB image and depth data.

Given the output $e_a=\{e_a^1, e_a^2, e_a^3, e_a^4\}$ from the RGB saliency encoder and $e_g=\{e_g^1, e_g^2, e_g^3, e_g^4\}$ from the depth saliency encoder, the "Latent Feature" module 306 is developed to map $e_a$ and $e_g$ to latent feature $z_a=f_{\beta_a}(e_a)$ and $z_g=f_{\beta_g}(e_g)$ respectively, where $\beta_a$ and $\beta_g$ are the parameters of the latent feature module for RGB images and depth respectively. First $\{e^c\}_{c=1}^4$ is concatenated along channels to obtain a feature map having a channel size 4*C, and then fed to the latent feature net for latent feature extraction. The latent feature module is composed of five convolutional layers and two fully connected layers. The five convolutional layers may have the same kernel size of 4×4 and stride size 2. The convolutional layers gradually map the appearance features or geometric features of channel size 4*C to feature maps of channel size C, 2*C, 4*C, 8*C and 2*C respectively and a 2*C channel feature map is obtained at the end. The two fully connected layers with a size K=6 are then adopted to obtain the mean μ and standard deviation σ of the latent feature z following a variational auto-encoder (VAE) learning pipeline. The latent feature z is reconstructed using reparameterization according to $z=\mu+\in*\sigma$, where $\in \sim N(0,1)$, as described in Kingma et al (2013) "Auto-Encoding Variational Bayes", ICLR, which is incorporated herein by reference in its entirety.

After obtaining the latent features $z_a$ and $z_g$ for the RGB image and depth data, a mutual information minimization regularizer is introduced to explicitly reduce the redundancy between these two modalities. The basic assumption is that a good appearance saliency feature and geometric saliency feature pair should carry both common parts (semantic related) and different attributes (domain related). Mutual information $M_I$ is used to measure the difference between the entropy terms:

$$M_I(z_a,z_g)=H(z_a)+H(z_g)-H(z_a,z_g), \quad (1)$$

Where H(•) is the entropy, $H(z_a)$ and $H(z_g)$ are marginal entropies, and $H(z_a, z_g)$ is the joint entropy of $z_a$ and $z_g$. Intuitively, this provides the Kullback-Liebler divergence (KL) of the two latent variables (or the conditional entropies) as:

$$KL(z_a\|z_g)=H(z_a,z_g)-H(z_a), \quad (2)$$

$$KL(z_g\|z_a)=H(z_a,z_g)-H(z_g), \quad (3)$$

Combing Eq. 1, Eq. 2 and Eq. 3 gives:

$$M_I(z_a,z_g)=H(z_a,z_g)-(KL(z_a\|z_g)+KL(z_g\|z_a)) \quad (4)$$

Given the RGB image and the depth data, $M_I(z_a, z_g)$ is non-negative and fixed, then minimizing the mutual information can be achieved by minimizing the negative symmetric KL term: $\mathcal{L}=-(KL(z_a\|z_g)+KL(z_g\|z_a))$. Intuitively, $M_I(z_a, z_g)$ is the reduction of uncertainty in $z_a$ when $z_g$ is observed, or vice versa. As a multi-modal learning task, each modality should learn some new attributes of the task from other modalities. Thus, by minimizing $M_I(z_a, z_g)$, it is possible to effectively explore the complementary attributes of both modalities.

Moreover, as $z_a$ encodes the appearance information, and $z_g$ encodes the geometric information, it is intended to fuse the appearance feature and geometric feature in the latent space to achieve effective multi-modal fusion. Specifically, $e_a^4$ is mapped from the RGB saliency encoder branch to a K=32 dimensional feature vector by using one fully connected layer. Next, it is concatenated with $z_g$, and the concatenated feature mapped with one DenseASPP [49] to obtain the RGB saliency prediction $P_a$. Similarly, the depth saliency prediction $P_g$ is obtained by fusing $e_g^4$ with $z_a$.

With the complementary learning branch, RGB saliency prediction $P_a$ and depth saliency prediction $P_g$ is obtained with latent features from depth and the RGB image respectively. The saliency decoder $f_\gamma$ takes the saliency features from the saliency encoder branches in FIG. 3, as well as $P_a$ and $P_g$ as input to compute the final prediction, where γ is the parameter set of the saliency decoder. Specifically, with the output from the RGB saliency encoder given by $e_a=\{e_a^1, e_a^2, e_a^3, e_a^4\}$, and the output from the depth saliency encoder given by $e_g=\{e_g^1, e_g^2, e_g^3, e_g^4\}$, a position attention module and a channel attention module, as described in Fu et al. (2019), "Dual Attention Network for Scene Segmentation," IEEE/CVF Conference on Computer Vision and Pattern Recognition (CVPR), which is incorporated herein by reference in its entirety, are added after each $\{e_a^c\}_{c=1}^4$ and $\{e_g^c\}_{c=1}^4$. The four groups of feature maps are concatenated after the dual attention and fed to the DenseASPP to obtain the saliency prediction $P_f$. To further fuse information from both modalities, $P_a$, $P_g$ and $P_f$ are concatenated channel-wise, and fed to a 3×3 convolutional layer to achieve the final prediction P.

A binary cross-entropy loss $\mathcal{L}_{ce}$ is adopted as the objective function to train the latent variable model based complementary learning framework, where the complementary constraint, as indicated in Eq. (1), pushes the saliency feature distribution of the RGB image to be apart from that of the depth data. The final objective function is:

$$\mathcal{L}=\mathcal{L}_{ce}(P,Y)+\lambda_1\mathcal{L}_{ce}(P_f,Y)+\lambda_2\mathcal{L}_{ce}(P_a,Y)+\lambda_3\mathcal{L}_{ce}(P_g,Y)+\lambda\mathcal{L}_{mi}(z_a,z_g), \quad (5)$$

Empirically, the vales are set as $\lambda_1=0.8$, $\lambda_2=0.6$, $\lambda_3=0.4$, $\lambda=0.1$ for the current description although other values may be used.

The saliency detection described above may be used in various different architectures, including for example in scribble based saliency detection, polygon based saliency detection, and stereo image based saliency detection.

Figure 4:
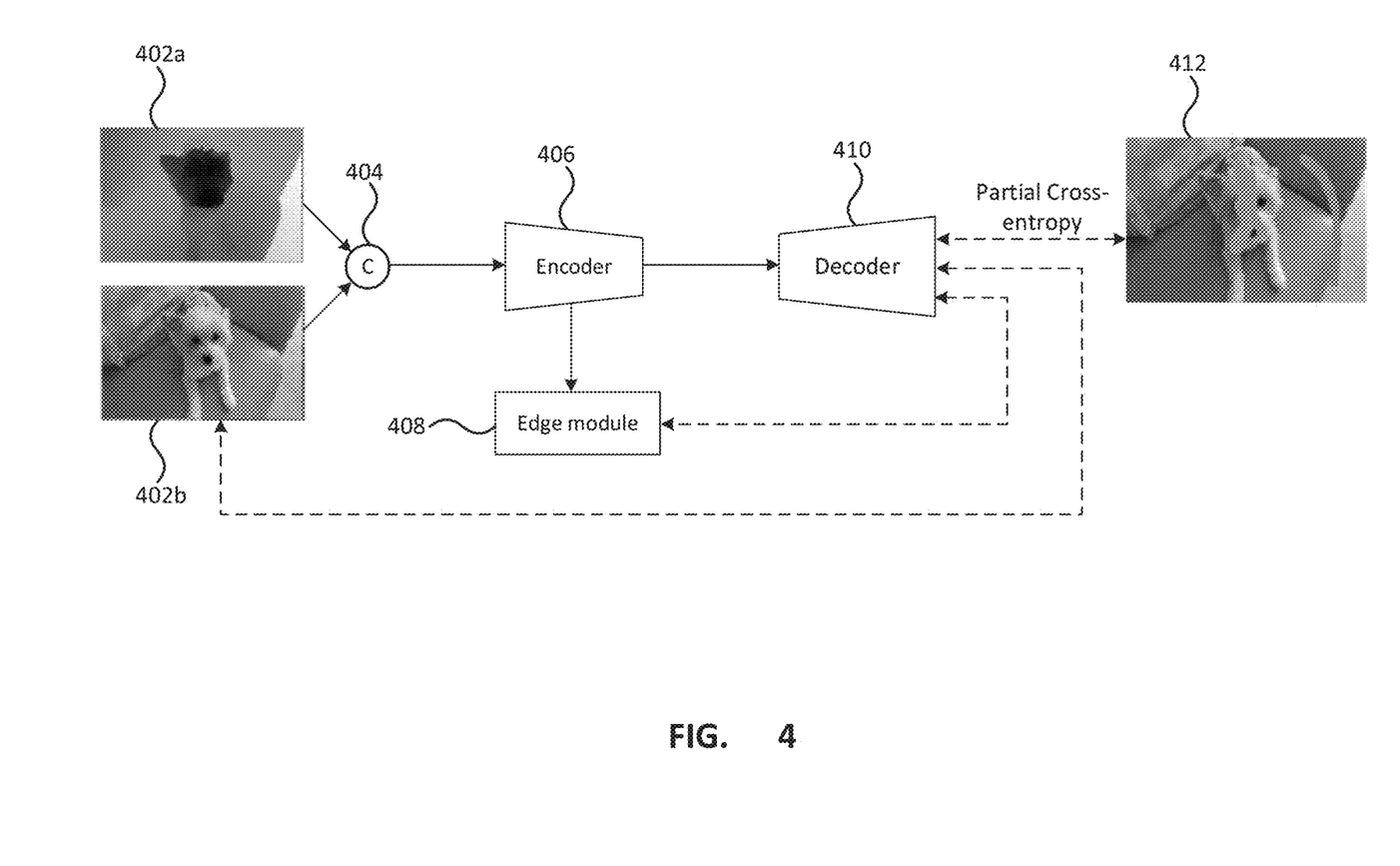
FIG. 4 depicts a network architecture for scribble based RGB-D saliency detection.

FIG. 4 depicts a network architecture for scribble based RGB-D saliency detection. The network structure of the scribble based RGB-D saliency detection baseline shown in FIG. 4 uses an encoder 406 and decoder 410 that are substantially the same as the encoder/decoder network described above. The partial cross-entropy loss, which is a weakly supervised version of the cross-entropy loss that depends only on the labeled pixels and ignores those unlabeled region, is used to supervise the partial annotation, e.g. the scribble annotation 412. The edge module 408 may be similar to that described in Zhang et al. (2020) "Weakly-supervised salient object detection via scribble annotations," IEEE Conference on Computer Vision and Pattern Recognition, which is supervised by the gradients of the network prediction. The smoothness loss as in Zhang et al. (2020) "Weakly-supervised salient object detection via scribble annotations," IEEE Conference on Computer Vision and Pattern Recognition, is also adopted to further recover structure information from the raw image. The first layer of the encoder 406 may be modified from that described above in or, thus it can take the concatenation 404 of the RGB image 402b and depth map 402a as input.

Figure 5:
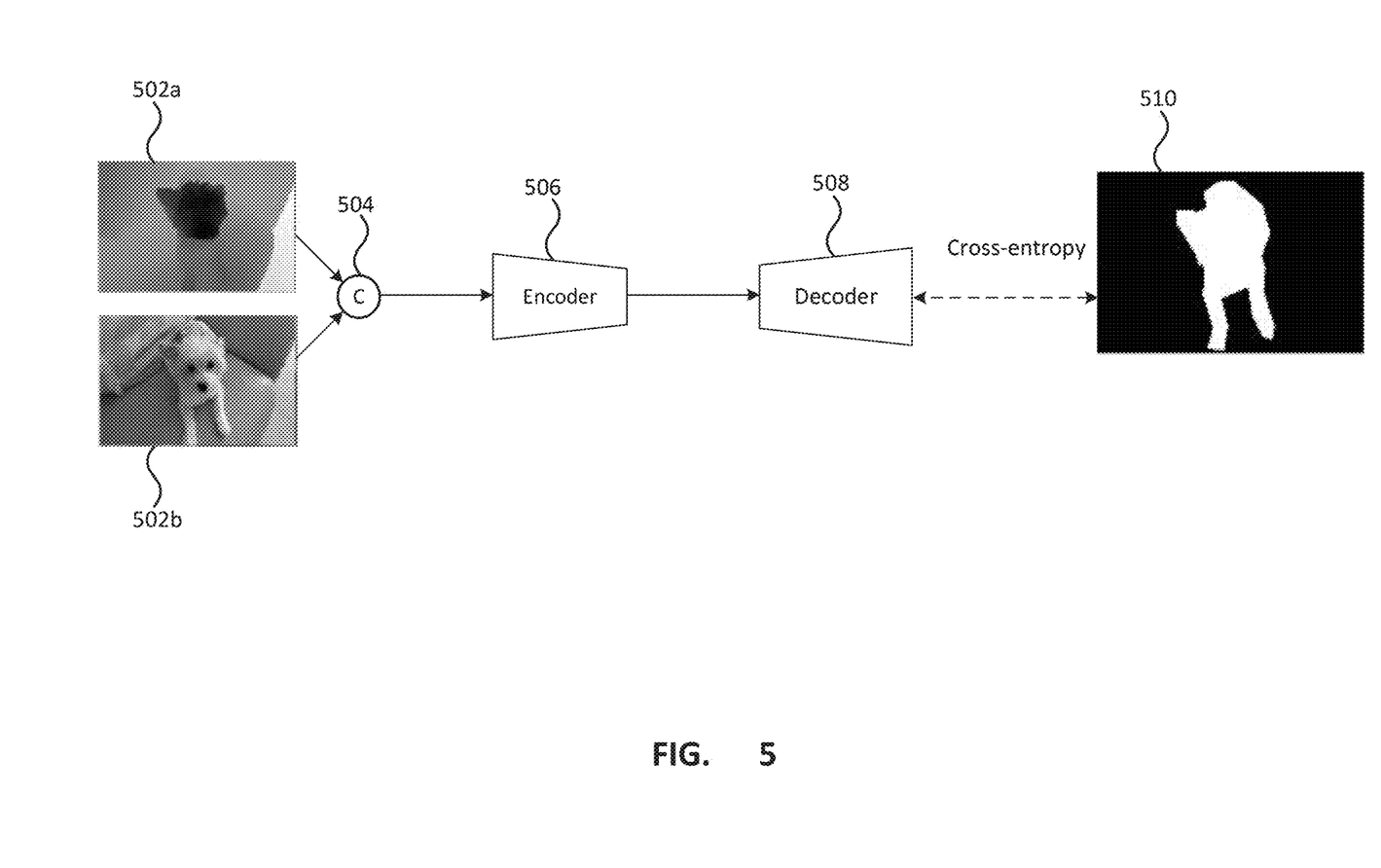
FIG. 5 depicts a network architecture for polygon based saliency detection.

FIG. 5 depicts a network architecture for polygon based saliency detection. Polygon annotations 510 are much more dense than scribble annotation. In this way, it is possible to simply learn from the polygon annotation with an encoder 506 and decoder 508 network, which may directly compute the cross-entropy loss of the network prediction and the polygon ground truth saliency map. Similar to the scribble saliency network, the encoder 506 and decoder 508 are similar to the encoder and decoder described above. As with the scribble-based network described above, the first layer of the encoder 506 may be modified so that it can take the concatenation 504 of the RGB image 502b and depth map 502a as input.

Figure 6:
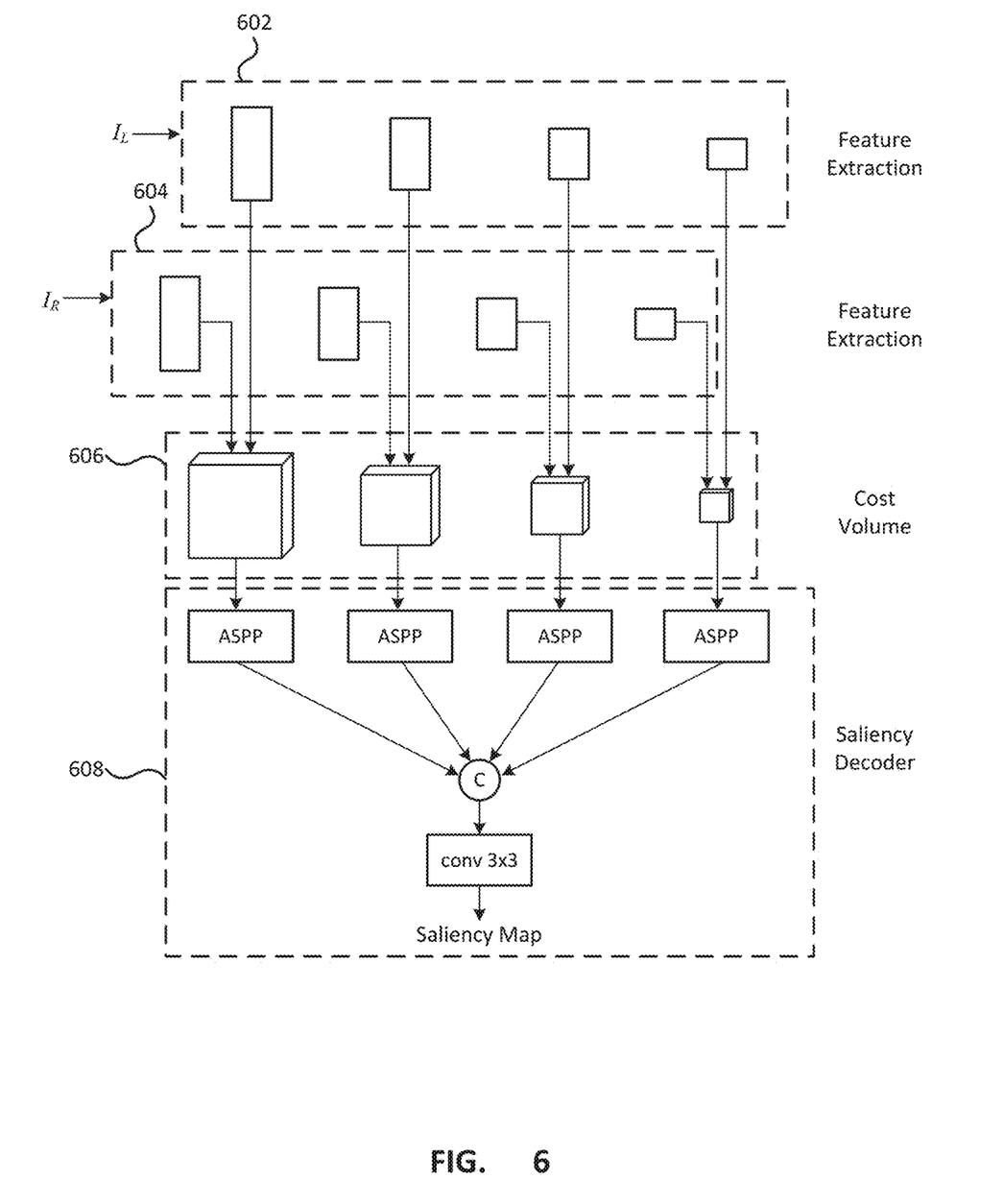
FIG. 6 depicts a network architecture for stereoscopic saliency detection.

FIG. 6 depicts a network architecture for stereoscopic saliency detection. A decoder similar to the decoder described above may be used for saliency detection on stereoscopic images. Although there exists stereo saliency detection models, none of these models directly take the left/right view images as input. Different from RGB-D saliency detection models, which directly take the depth data as input, the stereo saliency model depicted in FIG. 5 implicitly model the depth information with the cost volume 606. Specifically, features of the left and right stereo images with two different feature extraction modules 602, 604, which may be built upon ResNet50 backbone (sharing weights). The cost volume of stereo images in each stage of network is obtained. An ASPP module as described in [20] may be used in the saliency decoder 608 after each cost volume operation to obtain feature of expanded receptive field. Finally, the different stages of features may be concatenated and the result fed to a 3×3 convolutional layer to generate final prediction of the saliency map.

The proposed complementary learning framework CLNet described above was compared with competing RGB-D saliency detection models, and the performance is shown in Tables 1 and 2 below. Furthermore, the state-of-the-art RGB-D saliency detection models were retrained on a new training dataset COME20K, and the performance of those models on the new testing dataset provided in in Table 3.

RGB-D Saliency Detection Testing

Dataset

For fair comparisons with existing RGB-D saliency detection models, the conventional training setting was followed, in which the training set is a combination of 1,485 images from the NJN2K dataset as described in Ju et al. (2015), "Depth-aware salient object detection using anisotropic center-surround difference," Signal Processing: Image Communication and 700 images from the NLPR dataset Peng et al. (2014) "RGBD Salient object detection: A benchmark and algorithms," European Conference on Computer Vision. The performance of the current model and competing models was then tested on the NJU2K testing set, NLPR, testing set LFSD as described in Li et al. (2014) "Saliency Detection on Light Fields," IEEE Conference on Computer Vision and Pattern Recognition (CVPR), DES as described in Cheng et al. (2014) "Depth enhanced saliency detection method," ACM ICIMCS, SSB as described in Niu et al. (2012) "Leveraging stereopsis for saliency analysis," IEEE Conference on Computer Vision and Pattern Recognition (CVPR) SIP as described in Fan et al. (2020) "BBS-net: RGB-d salient object detection with a bifurcated backbone strategy network," European Conference on Computer Vision, and DUT testing set as described in Piao et al. (2019), "Depth-induced multi-scale recurrent attention network for saliency detection," International Conference on Computer Vision, each of which are incorporated herein by reference.

Metrics

The performance of the models was evaluated on four golden evaluation metrics, i.e., Mean Absolute Error ($\mathcal{M}$), Mean F-measure ($F_\beta$), Mean E-measure ($E_\xi$) as described in Fan et al. (2018) "Enhanced-alignment measure for binary foreground map evaluation," International Joint Conference on Artificial Intelligence and S-measure ($S_\alpha$) described in Fan et al. (2017) "Structure-measure: A new way to evaluate foreground maps," International Conference on Computer Vision, each of which are incorporated herein by reference.

Training Details

The CLNet model is trained in Pytorch using the ResNet50, as described in He et al. (2016) "Deep residual learning for image recognition," IEEE Conference on Computer Vision and Pattern Recognition (CVPR), which is incorporated herein by reference, as a backbone as shown in FIG. 3. The encoders of RGB and depth share the same network structure, and are initialized with ResNet50 trained on ImageNet, and other newly added layers are randomly initialized. All the images are randomized and ground truth to the same spatial size of 352×352 pixels. The maximum epoch was set as 100, and initial learning rate as 5e-5. The "step" learning rate decay policy was adopted, and the decay size set as 80, and decay rate as 0.1. The whole training takes 4.5 hours with batch size 5 on an NVIDIA GeForce RTX 2080 GPU.

Quantitative Comparison

The performance of the CLNet and state-of-the-art RGB-D saliency detection models were compared, and the performance reported in Table1. The training set of NJU2K and NLPR were used as competing deep RGB-D saliency detection models. It was observed that performance differences of current RGB-D saliency detection were very subtle, e.g. HDFNet as described in Pang et al. (2020) "Hierarchical Dynamic Filtering Network for RGB-d Salient Object Detection," European Conference on Computer Vision, BiaNet as described in Zhang et al. (2020) "Bilateral attention network for rgb-d salient object detection," arXiv preprint arXiv:2004.14582, and CoNet as described in Ji et al. (2020) "Accurate RGB-d Salient Object Detection Via Collaborative Learning," European Conference on Computer Vision, all of which are incorporated herein by reference. The consistently better performance of the current model indicate the effectiveness of the solution.

Performance on DUT Dataset

Some existing RGB-D saliency detection approaches fine-tune their models on the DUT training dataset as described in Piao et al. (2019) "Depth-induced multi-scale recurrent attention network for saliency detection," International Conference on Computer Vision, which is incorporated herein by reference, to evaluate their performance on the DUT testing set. To test the CLNet model on the DUT testing set, the same training strategy was followed. In Table 2, all the models were trained with the conventional training set and then fine-tuned on the DUT training set. The consistently superior performance of the CLNet model further illustrates the superiority of the current model. Furthermore, since the current testing performance is achieved in a train-retrain manner, these models were re-trained with a combination of the conventional training set and DUT as the training set, and observe consistently worse performance in this case. This observation indicates that inconsistent annotations may occur in these three training sets (i.e., NJU2K, NLPR and DUT). It also motivates the collection a larger training dataset (COME20K) with consistent annotations for robust model training, which is described in Appendix A.

Qualitative Comparison

The prediction of the CLNet and other models is visualized in FIG. 4. The qualitative comparisons demonstrate that with the complementary learning strategy, the CLNet model can explore better complementary information for effective multi-modal learning.

It is believed that three main factors may influence the performance of CLNet, including: (1) the dimension of the latent space; (2) the structure of the "Latent Feature" module; and (3) the weight of the mutual information regularizer term in Eq. (5). Three main ablation studies were performed to further analyse the components of the current model as described below.

The Dimension of the Latent Space

The dimension of latent space was set as K=6. To test the impacts of different dimensions of the latent space on the network performance, the latent space was set as K=3 and K=32, and then their performance reported as "K3" and "K32" respectively in Table 4. The experimental results demonstrates that the current model achieves relative stable performance with different dimensions of the latent space. This is because the features from the "Saliency Encoder" module are representative.

The Structure of the "Latent Feature" Module

As described above, the "Latent Feature" module is composed of five convolutional layers and two fully connected layers for latent feature extraction. One may also achieve latent feature extraction directly from the output of the "Saliency Encoder". Specifically, it is possible to use two fully connected layers to map the concatenation of $\{e^c\}_{c=1}^4$ to $\mu$ and $\sigma$. In Table 4, the performance of the CLNet model reported with this simple setting, marked as "SS". It is observed that the performance decreases, which indicates desirability of introducing more nonlinearity to effectively extract the latent feature of each modality.

The Weight of the Mutual Information Regularizer

The weight $\lambda$ of the mutual information regularization term controls the level of complementary information. Empirically, as described herein, $\lambda=0.1$. How the model performs with smaller or larger $\lambda$ was then tested, setting $\lambda$ according to $\lambda=0$ and $\lambda=1$ respectively. The performance of those variants is shown in Table 4, denoted by "W0" and "W1". The inferior performance of "W0" indicates the effectiveness of the current complementary information modeling strategy. Meanwhile, compared with CLNet, relatively worse performance of "W1" was observed, which indicates the mutual information regularizer can indeed influence model performance.

TABLE 1

Benchmarking results of three leading handcrafted feature-based models and 17 deep models denoted with (*) on six RGB-D saliency datasets. ↑ & ↓ denote that larger or smaller values are better, respectively. The table adopts mean $F_\beta$ and mean $E_\xi$.

| | Metric | Early Fusion Models | | | | Late Fusion Models | | | | | | Cross-level Fusion Models |
|---|---|---|---|---|---|---|---|---|---|---|---|---|
| | | DF* | DANet* | UCNet* | JLDCF* | LHM | DESM | CDB | A2dele* | AFNet* | CTMF* | DMRA* |
| NJU2K | $S_\alpha$ ↑ | .763 | .897 | .897 | .902 | .514 | .665 | .632 | .873 | .822 | .849 | .886 |
| | $F_\beta$ ↑ | .653 | .877 | .886 | .885 | .328 | .550 | .498 | .867 | .827 | .779 | .873 |
| | $E_\xi$ ↑ | .700 | .926 | .930 | .935 | .447 | .590 | .572 | .913 | .867 | .846 | .920 |
| | $\mathcal{M}$ ↓ | .140 | .046 | .043 | .041 | .205 | .283 | .199 | .051 | .077 | .085 | .051 |
| SSB | $S_\alpha$ ↑ | .757 | .892 | .903 | .903 | .562 | .642 | .615 | .876 | .825 | .848 | .835 |
| | $F_\beta$ ↑ | .617 | .857 | .884 | .873 | .378 | .519 | .489 | .874 | .806 | .758 | .837 |
| | $E_\xi$ ↑ | .692 | .915 | .938 | .936 | .484 | .579 | .561 | .925 | .872 | .841 | .879 |
| | $\mathcal{M}$ ↓ | .141 | .048 | .039 | .040 | .172 | .295 | .166 | .044 | .075 | .086 | .066 |
| DES | $S_\alpha$ ↑ | .752 | .905 | .934 | .931 | .578 | .622 | .645 | .881 | .770 | .863 | .900 |
| | $F_\beta$ ↑ | .604 | .848 | .919 | .907 | .345 | .483 | .502 | .868 | .713 | .756 | .873 |
| | $E_\xi$ ↑ | .684 | .961 | .967 | .959 | .477 | .566 | .572 | .913 | .809 | .826 | .933 |
| | $\mathcal{M}$ ↓ | .093 | .028 | .019 | .021 | .114 | .299 | .100 | .030 | .068 | .055 | .030 |
| NLPR | $S_\alpha$ ↑ | .806 | .908 | .920 | .925 | .630 | .572 | .632 | .887 | .799 | .860 | .899 |
| | $F_\beta$ ↑ | .664 | .850 | .891 | .894 | .427 | .430 | .421 | .871 | .755 | .740 | .865 |
| | $E_\xi$ ↑ | .757 | .945 | .951 | .955 | .560 | .542 | .567 | .933 | .851 | .840 | .940 |
| | $\mathcal{M}$ ↓ | .079 | .031 | .025 | .022 | .108 | .312 | .108 | .031 | .058 | .056 | .031 |
| LFSD | $S_\alpha$ ↑ | .791 | .845 | .864 | .862 | .557 | .722 | .520 | .831 | .738 | .796 | .847 |
| | $F_\beta$ ↑ | .679 | .826 | .855 | .848 | .396 | .612 | .376 | .829 | .736 | .756 | .845 |
| | $E_\xi$ ↑ | .725 | .872 | .901 | .894 | .491 | .638 | .465 | .872 | .796 | .810 | .893 |
| | $\mathcal{M}$ ↓ | .138 | .082 | .066 | .070 | .211 | .248 | .218 | .076 | .134 | .119 | .075 |
| SIP | $S_\alpha$ ↑ | .653 | .878 | .875 | .880 | .511 | .616 | .557 | .826 | .720 | .716 | .806 |
| | $F_\beta$ ↑ | .463 | .829 | .867 | .873 | .287 | .496 | .341 | .827 | .702 | .608 | .811 |
| | $E_\xi$ ↑ | .565 | .914 | .914 | .918 | .437 | .564 | .455 | .887 | .793 | .704 | .844 |
| | $\mathcal{M}$ ↓ | .185 | .054 | .051 | .049 | .184 | .298 | .192 | .070 | .118 | .139 | .085 |

| | Metric | Cross-level Fusion Models | | | | | | | | | |
|---|---|---|---|---|---|---|---|---|---|---|---|
| | | PCF* | MMCI* | TANet* | CPFP* | S2MA* | BBS-Net* | CoNet* | HDFNet* | BiaNet* | CLnet* |
| NJU2K | $S_\alpha$ ↑ | .877 | .858 | .879 | .878 | .894 | .921 | .911 | .908 | .915 | .933 |
| | $F_\beta$ ↑ | .840 | .793 | .841 | .850 | .865 | .902 | .903 | .892 | .903 | .916 |
| | $E_\xi$ ↑ | .895 | .851 | .895 | .910 | .914 | .938 | .944 | .936 | .934 | .949 |
| | $\mathcal{M}$ ↓ | .059 | .079 | .061 | .053 | .053 | .035 | .036 | .038 | .039 | .034 |
| SSB | $S_\alpha$ ↑ | .875 | .873 | .871 | .879 | .890 | .908 | .896 | .900 | .904 | .915 |
| | $F_\beta$ ↑ | .818 | .813 | .828 | .841 | .853 | .883 | .877 | .870 | .879 | .887 |
| | $E_\xi$ ↑ | .887 | .873 | .893 | .911 | .914 | .928 | .939 | .931 | .926 | .943 |
| | $\mathcal{M}$ ↓ | .064 | .068 | .060 | .051 | .051 | .041 | .040 | .041 | .043 | .036 |
| DES | $S_\alpha$ ↑ | .842 | .848 | .858 | .872 | .941 | .933 | .906 | .926 | .931 | .947 |
| | $F_\beta$ ↑ | .765 | .735 | .790 | .824 | .909 | .910 | .880 | .910 | .910 | .928 |
| | $E_\xi$ ↑ | .838 | .825 | .863 | .888 | .952 | .949 | .939 | .957 | .948 | .973 |
| | $\mathcal{M}$ ↓ | .049 | .065 | .046 | .038 | .021 | .021 | .026 | .021 | .021 | .016 |
| NLPR | $S_\alpha$ ↑ | .874 | .856 | .886 | .888 | .916 | .930 | .900 | .923 | .925 | .935 |
| | $F_\beta$ ↑ | .802 | .737 | .819 | .840 | .873 | .896 | .859 | .894 | .894 | .902 |

TABLE 1-continued

Benchmarking results of three leading handcrafted feature-based models and 17 deep models denoted with (*) on six RGB-D saliency datasets. ↑ & ↓ denote that larger or smaller values are better, respectively. The table adopts mean $F_\beta$ and mean $E_\xi$.

|      |              |      |      |      |      |      |      |      |      |      |      |
|------|--------------|------|------|------|------|------|------|------|------|------|------|
|      | $E_\xi$ ↑    | .887 | .841 | .902 | .918 | .937 | .950 | .937 | .955 | .948 | .958 |
|      | $M$ ↓        | .044 | .059 | .041 | .036 | .030 | .023 | .030 | .023 | .024 | .020 |
| LFSD | $S_\alpha$ ↑ | .794 | .787 | .801 | .828 | .837 | .864 | .842 | .854 | .845 | .867 |
|      | $F_\beta$ ↑  | .761 | .722 | .771 | .811 | .806 | .843 | .834 | .835 | .834 | .856 |
|      | $E_\xi$ ↑    | .818 | .775 | .821 | .863 | .855 | .883 | .886 | .883 | .871 | .903 |
|      | $M$ ↓        | .112 | .132 | .111 | .088 | .094 | .072 | .077 | .077 | .085 | .064 |
| SIP  | $S_\alpha$ ↑ | .842 | .833 | .835 | .850 | .872 | .879 | .868 | .886 | .883 | .889 |
|      | $F_\beta$ ↑  | .814 | .771 | .803 | .821 | .854 | .868 | .855 | .875 | .873 | .882 |
|      | $E_\xi$ ↑    | .878 | .845 | .870 | .893 | .905 | .906 | .915 | .923 | .913 | .928 |
|      | $M$ ↓        | .071 | .086 | .075 | .064 | .057 | .055 | .054 | .047 | .052 | .046 |

TABLE 2

Model performance on DUT testing set

| Metric | UCNet | JLDCF | A2dele | DMRA | CPFP | S2MA | CoNet | HDFNet | CLNet Ours |
|---|---|---|---|---|---|---|---|---|---|
| $S_\alpha$ ↑ | .907 | .905 | .884 | .886 | .749 | .903 | .919 | .905 | .925 |
| $F_\beta$ ↑  | .902 | .884 | .889 | .883 | .695 | .881 | .911 | .889 | .918 |
| $E_\xi$ ↑    | .931 | .932 | .924 | .924 | .759 | .926 | .947 | .929 | .956 |
| $M$ ↓        | .038 | .043 | .043 | .048 | .100 | .044 | .033 | .040 | .031 |

TABLE 3

Performance on the test sets of COME20K

| | Metric | UCNet | JLDCF | A2dele | DMRA | CPFP | S2MA | CoNet | BBS-Net | CLNet Ours |
|---|---|---|---|---|---|---|---|---|---|---|
| Normal | $S_\alpha$ ↑ | .894 | .894 | .833 | .782 | .795 | .877 | .820 | .902 | .906 |
| | $F_\beta$ ↑ | .883 | .875 | .835 | .744 | .716 | .829 | .796 | .879 | .883 |
| | $E_\xi$ ↑ | .929 | .919 | .882 | .812 | .801 | .881 | .850 | .923 | .924 |
| | $M$ ↓ | .036 | .042 | .060 | .105 | .104 | .059 | .082 | .039 | .036 |
| Difficult | $S_\alpha$ ↑ | .822 | .845 | .787 | .743 | .770 | .828 | .779 | .853 | .859 |
| | $F_\beta$ ↑ | .814 | .832 | .795 | .724 | .704 | .789 | .774 | .834 | .843 |
| | $E_\xi$ ↑ | .859 | .870 | .838 | .775 | .776 | .836 | .813 | .876 | .887 |
| | $M$ ↓ | .079 | .075 | .092 | .137 | .131 | .092 | .113 | .071 | .068 |

TABLE 4

Performance of the ablation study models

| | NJU2K | | | | SSB | | | | DES | | | |
|---|---|---|---|---|---|---|---|---|---|---|---|---|
| Method | $S_\alpha$ ↑ | $F_\beta$ ↑ | $E_\xi$ ↑ | $M$ ↓ | $S_\alpha$ ↑ | $F_\beta$ ↑ | $E_\xi$ ↑ | $M$ ↓ | $S_\alpha$ ↑ | $F_\beta$ ↑ | $E_\xi$ ↑ | $M$ ↓ |
| K3 | .928 | .908 | .947 | .032 | .909 | .892 | .939 | .036 | .934 | .922 | .964 | .018 |
| K32 | .924 | .909 | .944 | .033 | .908 | .894 | .941 | .036 | .938 | .923 | .966 | .017 |
| SS | .916 | .907 | .943 | .034 | .899 | .882 | .932 | .040 | .936 | .927 | .968 | .017 |
| W0 | .918 | .907 | .944 | .033 | .892 | .877 | .923 | .042 | .934 | .924 | .964 | .017 |
| W1 | .919 | .909 | .946 | .032 | .905 | .886 | .937 | .037 | .938 | .927 | .971 | .016 |
| CLNet | .933 | .916 | .949 | .034 | .915 | .887 | .943 | .036 | .947 | .928 | .973 | .016 |

| | NLPR | | | | LFSD | | | | SIP | | | |
|---|---|---|---|---|---|---|---|---|---|---|---|---|
| Method | $S_\alpha$ ↑ | $F_\beta$ ↑ | $E_\xi$ ↑ | $M$ ↓ | $S_\alpha$ ↑ | $F_\beta$ ↑ | $E_\xi$ ↑ | $M$ ↓ | $S_\alpha$ ↑ | $F_\beta$ ↑ | $E_\xi$ ↑ | $M$ ↓ |
| K3 | .925 | .904 | .956 | .022 | .869 | .845 | .898 | .067 | .885 | .879 | .919 | .047 |
| K32 | .927 | .906 | .959 | .021 | .856 | .853 | .900 | .065 | .885 | .878 | .921 | .046 |
| SS | .920 | .896 | .954 | .024 | .861 | .852 | .889 | .077 | .885 | .876 | .920 | .047 |

TABLE 4-continued

Performance of the ablation study models

| | | | | | | | | | | | | |
|---|---|---|---|---|---|---|---|---|---|---|---|---|
| W0 | .924 | .900 | .945 | .023 | .843 | .836 | .881 | .076 | .884 | .878 | .916 | .048 |
| W1 | .923 | .903 | .956 | .022 | .857 | .853 | .891 | .071 | .887 | .882 | .921 | .045 |
| CLNet | .935 | .902 | .958 | .020 | .867 | .856 | .903 | .064 | .889 | .882 | .928 | .046 |

In the above tables, the models tested are:

Early Fusion Models

DF as described by Qu et a. (2017) "RGBD salient object detection via deep fusion,' *IEEE Transactions on Image Processing;*

DANet as described by Zhao et al. (2020) "A single stream network for robust and real-time RGB-d salient object detection," *European Conference on Computer Vision;*

UCNet as described by Zhang et al. (2020) "UC-Net: Uncertainty inspired RGB-d saliency detection via conditional variational autoencoders," *IEEE Conference on Computer Vision and Pattern Recognition*; and JLDCF as described by Fu et al. (2020) JL-DCF: Joint learning and densely-cooperative fusion frame-work for RGB-d salient object detection,". *IEEE Conference on Computer Vision and Pattern Recognition.*

Late Fusion Models

LHM as described by Peng et al. (2014) "RGBd salient object detection: a benchmark and algorithms," *European Conference on Computer Vision;*

DESM as described by Cheng et al. (2014) "Depth enhanced saliency detection method," *ACM ICIMCS;*

CDB as described by Liang et al. (2018) "Stereoscopic saliency model using contrast and depth-guided-background prior," *Neurocomputing;*

A2dele as described by Piao et al. (2020) "A2dele: Adaptive and attentive depth distiller for efficient RGB-d salient object detection,' *IEEE Conference on Computer Vision and Pattern Recognition;*

AFNet as described by Wang et al. (2019) "Adaptive fusion for RGB-D salient object detection," *arXiv:*1901.01369; and CTMF as described by Han et al. (2018) "CNNs-based RGB-D saliency detection via cross-view transfer and multiview fusion," *IEEE Transactions on Cybernetics.*

Cross-Level Fusion Models

DMRA as described by Piao et al. (2019) "Depth-induced multi-scale recurrent attention network for saliency detection," *International Conference on Computer Vision;*

PCF as described by Chen et al. (2018) "Progressively complementarity-aware fusion network for RGB-D salient object detection," *IEEE Conference on Computer Vision and Pattern Recognition;*

MMCI as described by Chen et al. (2019) "Multi-modal fusion network with multi-scale multi-path and cross-modal interactions for RGB-D salient object detection," *Pattern Recognition;*

TANet as described by Chen et al. (2019) "Three-stream attention-aware network for RGB-D salient object detection,". *IEEE Transactions on Image Processing;*

CPFP as described by Zhao et al. (2019) "Contrast prior and fluid pyramid integration for RGBd salient object detection," *IEEE Conference on Computer Vision and Pattern Recognition;*

S2MA as described by Liu et al. (2020) "Learning selective self-mutual attention for RGB-d saliency detection," *IEEE Conference on Computer Vision Pattern Recognition;*

BBS-Net as described by Fan et al. (2020) "BBS-net: RGB-d salient object detection with a bifurcated backbone strategy network," *European Conference on Computer Vision;*

CoNet as described by Ji et al. (2020) "Accurate RGB-d salient object detection via collaborative learning," *European Conference on Computer Vision;*

HDFNet as described by Pang et al. (2020) "Hierarchical dynamic filtering network for RGB-d salient object detection," *European Conference Computer Vision;* and BiaNet as described by Zhang et al. (2020) "Bilateral attention network for RGB-d salient object detection" *arXiv preprint arXiv:*2004.14582.

All of the above noted papers are incorporated herein by reference in their entirety.

The model as described in the current description is CLNet.

Figure 7:
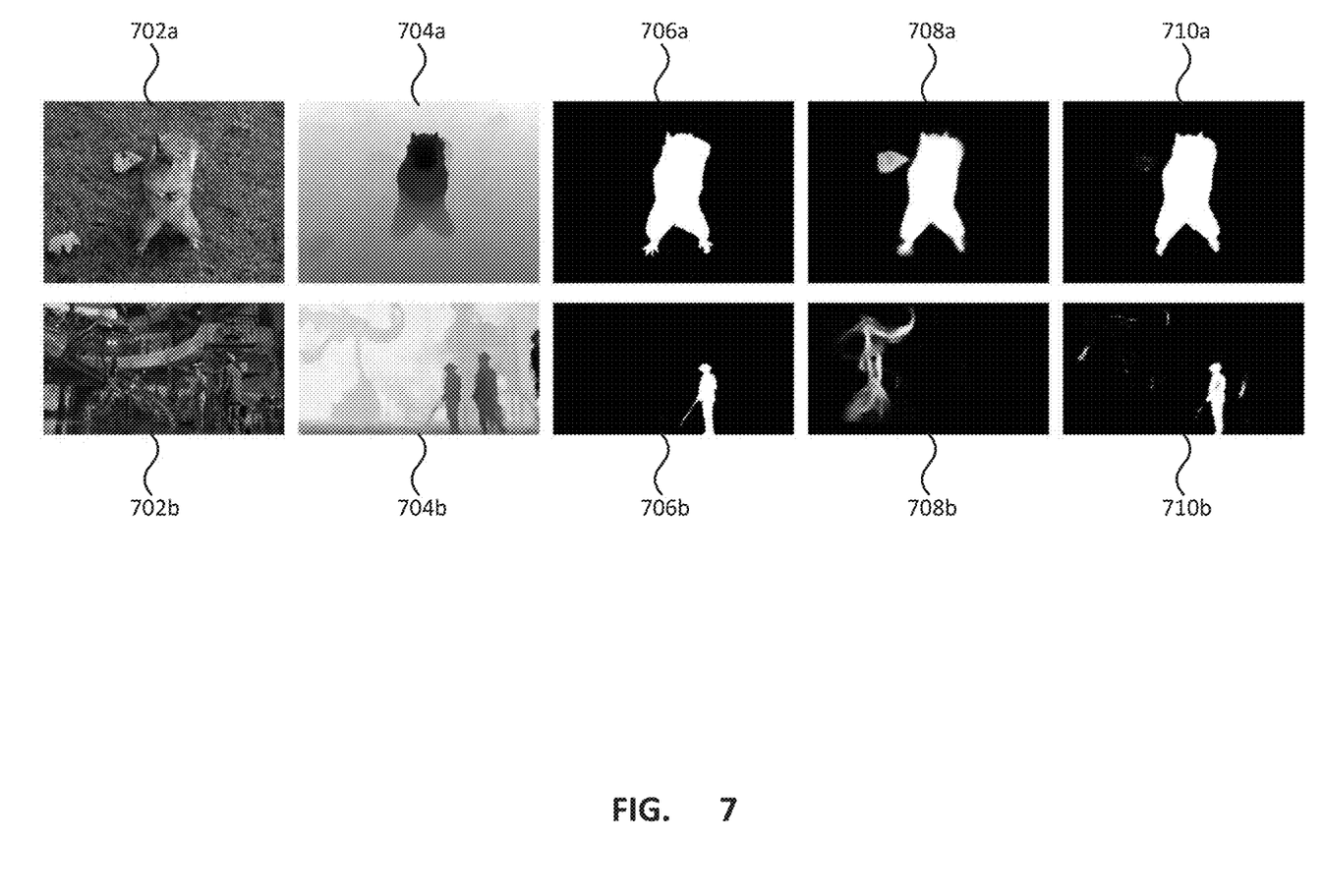
FIG. 7 depicts results of saliency detection.

FIG. 7 depicts results of saliency detection. Images 702*a*, 702*b* depict the RGB image input data and the images 704*a*, 704*b* depict the depth data. Images 706*a*, 706*b* depict the ground truth (GT), images 708*a*, 708*b* depict saliency detection results for BBSNet saliency detection, and images 710*a*, 710*b* depict saliency detection results for the current saliency detection.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the components and processes described herein may be provided by various combinations of software, firmware and/or hardware, other than the specific implementations described herein as illustrative examples.

The techniques of various embodiments may be implemented using software, hardware and/or a combination of software and hardware. Various embodiments are directed to apparatus, e.g. a node which may be used in a communications system or data storage system. Various embodiments are also directed to non-transitory machine, e.g., computer, readable medium, e.g., ROM, RAM, CDs, hard discs, etc., which include machine readable instructions for controlling a machine, e.g., processor to implement one, more or all of the steps of the described method or methods.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope.

What is claimed is:

1. A method of saliency detection on images including both appearance and depth information, the method comprising:
    processing appearance information of an image with a first saliency encoder to extract appearance features from the image;
    processing depth information of the image with a second saliency encoder to extract depth features from the image;
    processing the extracted appearance features with a first latent feature module to generate a latent appearance feature;
    processing the extracted depth features with a second latent feature module to generate a latent depth feature;
    in a first appearance complimentary learning branch, fusing at least a portion of the extracted appearance features with the latent depth feature to generate an appearance saliency prediction;
    in a second appearance complimentary learning branch, fusing at least a portion of the extracted depth features with the latent appearance feature to generate a depth saliency prediction; and
    processing the extracted appearance features, extracted depth features, appearance saliency prediction and depth saliency prediction to obtain a combined saliency prediction providing an indication of salient locations within the image.

2. The method of claim 1, wherein the first latent feature module and the second latent feature module are trained based on mutual information between latent appearance features of training images and latent depth features of the training images.

3. The method of claim 2, wherein the mutual information measures a difference between entropy of the latent appearance features of the training images and the latent depth features of the training images.

4. The method of claim 3, wherein an objective function used in training the first and second latent feature modules is given by:

$$\mathcal{L} = \mathcal{L}_{ce}(P,Y) + \lambda_1 \mathcal{L}_{ce}(P_f,Y) + \lambda_2 \mathcal{L}_{ce}(P_a,Y) + \lambda_3 \mathcal{L}_{ce}(P_g,Y) + \lambda \mathcal{L}_{mi}(z_a,z_g),$$

wherein $\mathcal{L}$, $\mathcal{L}_{ce}$, and $\mathcal{L}_{mi}$ are objective functions, wherein P, $P_f$, $P_a$, and $P_g$ are saliency predictions, wherein $z_a$ and $z_g$ are latent features;

wherein Y is a parameter set of the saliency decoder, and wherein $\lambda_1$, $\lambda_2$, $\lambda_3$, and $\lambda$ are constants.

5. The method of claim 1, wherein the first latent feature module and the second latent feature module each comprise five convolution layers and two fully connected layers.

6. The method of claim 5, wherein each of the five convolution layers of the first latent feature module and the second latent feature module have a kernel size of 4×4 and a stride size of 2.

7. The method of claim 1, wherein the first and second saliency encoders have a common network architecture.

8. The method of claim 7, wherein the common network architecture is based on a ResNet 50 network.

9. The method of claim 7, wherein the common network architecture comprises four convolutional groups.

10. The method of claim 9, wherein the common network architecture further comprises an additional convolutional layer of kernel size 3×3 after each convolutional group.

11. A non-transitory computer readable medium having stored thereon instructions, which when executed by a processor of a computing system, configure the computing system to perform a method of saliency detection on images including both appearance and depth information, the method comprising:
    processing appearance information of an image with a first saliency encoder to extract appearance features from the image;
    processing depth information of the image with a second saliency encoder to extract depth features from the image;
    processing the extracted appearance features with a first latent feature module to generate a latent appearance feature;
    processing the extracted depth features with a second latent feature module to generate a latent depth feature;
    in a first appearance complimentary learning branch, fusing at least a portion of the extracted appearance features with the latent depth feature to generate an appearance saliency prediction;
    in a second appearance complimentary learning branch, fusing at least a portion of the extracted depth features with the latent appearance feature to generate a depth saliency prediction; and
    processing the extracted appearance features, extracted depth features, appearance saliency prediction and depth saliency prediction to obtain a combined saliency prediction providing an indication of salient locations within the image.

12. The non-transitory computer readable medium of claim 11, wherein the first latent feature module and the second latent feature module are trained based on mutual information between latent appearance features of training images and latent depth features of the training images.

13. The non-transitory computer readable medium of claim 12, wherein the mutual information measures a difference between entropy of the latent appearance features of the training images and the latent depth features of the training images.

14. The non-transitory computer readable medium of claim 13, wherein an objective function used in training the first and second latent feature modules is given by:

$$\mathcal{L} = \mathcal{L}_{ce}(P,Y) + \lambda_1 \mathcal{L}_{ce}(P_f,Y) + \lambda_2 \mathcal{L}_{ce}(P_a,Y) + \lambda_3 \mathcal{L}_{ce}(P_g,Y) + \lambda \mathcal{L}_{mi}(z_a,z_g),$$

wherein $\mathcal{L}$, $\mathcal{L}_{ce}$, and $\mathcal{L}_{mi}$ are objective functions, wherein P, $P_f$, $P_a$, and $P_g$ are saliency predictions, wherein $z_a$ and $z_g$ are latent features, wherein Y is a parameter set of the saliency decoder, and wherein $\lambda_1$, $\lambda_2$, $\lambda_3$, and $\lambda$ are constants.

15. The non-transitory computer readable medium of claim 14, wherein the first latent feature module and the second latent feature module each comprise five convolution layers and two fully connected layers.

16. The non-transitory computer readable medium of claim 15, wherein each of the five convolution layers of the first latent feature module and the second latent feature module have a kernel size of 4×4 and a stride size of 2.

17. The non-transitory computer readable medium of claim 15, wherein the first and second saliency encoders have a common network architecture.

18. The non-transitory computer readable medium of claim 17, wherein the common network architecture is based on a ResNet 50 network.

19. The non-transitory computer readable medium of claim 17, wherein the common network architecture comprises four convolutional groups.

20. The non-transitory computer readable medium of claim 19, wherein the common network architecture further comprises an additional convolutional layer of kernel size 3×3 after each convolutional group.

21. A system saliency detection on images including both appearance and depth information, the system comprising:
a processor for executing instructions; and
a memory for storing instructions, which when executed by the processor configure the system to implement a method of saliency detection on images including both appearance and depth information, the method comprising:
processing appearance information of an image with a first saliency encoder to extract appearance features from the image;
processing depth information of the image with a second saliency encoder to extract depth features from the image;
processing the extracted appearance features with a first latent feature module to generate a latent appearance feature;
processing the extracted depth features with a second latent feature module to generate a latent depth feature;
in a first appearance complimentary learning branch, fusing at least a portion of the extracted appearance features with the latent depth feature to generate an appearance saliency prediction;
in a second appearance complimentary learning branch, fusing at least a portion of the extracted depth features with the latent appearance feature to generate a depth saliency prediction; and
processing the extracted appearance features, extracted depth features, appearance saliency prediction and depth saliency prediction to obtain a combined saliency prediction providing an indication of salient locations within the image.

* * * * *